Patented Mar. 26, 1929.

1,706,565

UNITED STATES PATENT OFFICE.

BAYLIS M. DAWSON, OF BROOKLYN, NEW YORK, ASSIGNOR TO THE FLEISCHMANN COMPANY, OF NEW YORK, N. Y., A CORPORATION OF OHIO.

YEAST COMPOSITION AND METHOD OF PREPARING THE SAME.

No Drawing.     Application filed June 30, 1922. Serial No. 572,088.

The beneficial effects of yeast as a food and as a medicinal agent of high vitamine content are well known and it has also heretofore been proposed to mix yeast, preferably fresh compressed yeast, as an ingredient of beverages, such for example as orangeade, in which fruit juices are also included. My present invention relates to a composition and a novel manner of preparing the same, in which yeast is associated with essential ingredients of natural fruit juices so as to form a composition which may be preserved for a considerable period of time and which affords great convenience either as a food or medicine and especially in preparing beverages such as those which may be dispensed at soda fountains.

In carrying out by invention fresh compressed yeast (preferably differing only from the ordinary yeast of commerce in that it contains no starch or other similar amylaceous admixture) may be mixed with a sufficient quantity of natural fruit juice or a diluted fruit juice, for example fresh natural orange juice, or a mixture of orange juice and water (with or without a sweetening agent such as sugar) to form a liquid mixture of sufficient fluidity to be capable of ready atomization, and this mixture is then subjected to desiccation suitably by spray drying. For this purpose the mixture may be atomized into the upper portion of a drying chamber at one side of the chamber while air of appropriate temperature for effecting the desiccation is forced into the drying chamber from the opposite side of its upper portion and the particles of the atomized liquid mixture thus coming into contact with the current of air give up to the latter for the most part their content of moisture as they pass through the drying chamber and are finally reduced to a dry condition and may be collected in the form of a powder by permitting them to gravitate into a hopper at the bottom of the drying chamber or by collecting them in any other suitable manner. If desired an auxiliary current of air may be blown into the drying chamber at a level below that at which the atomized liquid and first-mentioned air supply are introduced and the air of increased moisture content which has effected the drying of the particles may be withdrawn from the drying chamber by a suitable outlet which may be placed upon the opposite side of the drying chamber from the inlet of auxiliary air and at about the same level as the auxiliary air inlet. If the desiccated product is collected in a hopper at the bottom of the drying chamber this hopper will preferably be placed at a level sufficiently below that of the auxiliary air inlet and of the air outlet as to permit an efficient settling zone such as to avoid any considerable portion of the desiccated product being carried away with the current of air passing out from the drying chamber.

The temperature of the air supplied to the chamber and which comes into contact with the yeast in the initial drying zone (for example in the upper portion of the drying chamber as described) may be as high as 100° C. or even higher if it is not desired to preserve the viability of the yeast cells to the greatest possible extent. However, if it is desired to preserve the viability of the yeast cells to a maximum extent or if it is desired to avoid as far as possible any alteration in the composition of the fruit juices employed which might result from undue heating the drying may be effected by introducing air at a considerably lower temperature, for example 50° C. or even lower, and it will of course be apparent that whatever the temperature of the air at the point of its introduction into the chamber this temperature will be reduced considerably even in the initial drying zone by reason of the heat consumed in the evaporation of moisture from the mixture. If an auxiliary supply of air is introduced into the drying chamber as above referred to, this auxiliary supply of air may be introduced either at a lower or higher temperature than that prevailing in the drying zone from which the desiccated or partially desiccated particles pass into the zone to which the auxiliary air is supplied. For example if the air supplied to the initial drying zone has a temperature of 50° C. at the point of its entry into the drying chamber the actual temperature in the initial drying zone may be as low as 30–35° C. in which case the auxiliary air may be supplied at a temperature slightly higher than this, for example 35–40° C.

In carrying out this process an apparatus of the general type disclosed in U. S. Patent No. 1,090,740 to Wharton B. McLaughlin, issued March 17, 1914, may be suitably employed, although my invention is not limited to the employment of this particular type of apparatus nor to the particular method of operating described in said patent. In drying the yeast mixture I have also found that good results are obtained by atomizing the yeast mixture horizontally into the upper portion of a rectangular drying chamber about 4 ft. by 7½ ft. in cross section and 8 ft. high or preferably higher into which is also passed a current of air or other drying gas entering near the top of the chamber and preferably opposite to the point of entry of the yeast mixture, such current of air or other gas suitably entering through a long narrow horizontal slot and having a temperature at the point of entry of 45–100° C. Near the bottom of the drying chamber and suitably upon the same side of the chamber as that into which the yeast mixture is atomized an outlet is provided for the air or other gas which has been used in the desiccation and if desired there may be provided near the bottom of the drying chamber and suitably at a location approximately opposite to the outlet opening just mentioned an inlet opening for auxiliary air or other drying gas which may suitably be introduced at a temperature of about 35° C. or somewhat higher and which may serve to facilitate the desired desiccation of the particles of the yeast mixture as they fall through the drying chamber.

Preferably below the level of the outlet opening and opening for auxiliary desiccating gas there is provided a hopper or other suitable device for collecting the dried particles which gravitate from the upper portion of the chamber. In carrying out the process of my present invention I have found that certain substances which are present in fruit juices serve as protective colloids which surround the yeast cells and serve to regulate the desiccation of the mixture so that it proceeds without such damage to the vitality of the yeast cells as almost invariably has occurred in heretofore known yeast drying processes.

In case the fruit juice employed, as is especially noticeable for example in the case of fresh pineapple juice, is very quickly altered in its composition by the action of the yeast or by a certain degree of autolysis of the juice itself it may be found advantageous in order to avoid difficulties arising from such changes of composition or from incidental effervescence or frothing of the mixture either to blend the fruit juice, for example freshly expressed pineapple juice, and yeast immediately before their atomization together or to blend them at the point of atomization.

In my copending application for U. S Patent, Serial No. 572,087, filed simultaneously with the present application, I have described another specific procedure of preparing certain novel dried yeast compositions, in which yeast is also associated with certain other substances which would tend to undergo reaction or alteration by prolonged contact, and in which such alteration is substantially avoided by mixing such substances together substantially coincident with their atomization immediately prior to desiccating the substances by contact with an aeroform drying fluid. Generic claims for such method of desiccating such mixtures of yeast and associated reactive substances are presented in my aforesaid application, Serial No. 572,087.

While the proportions of yeast and fruit juice employed in accordance with the present invention may as is obvious be varied within rather wide limits, suitable compositions adapted for example for use in preparing soda fountain beverages by addition of water (plain or carbonated) and other flavorings if desired may be prepared by the desiccation of a mixture composed of yeast 10 pounds, orange juice 6 pints and water 6 pints; or yeast 10 pounds, fresh pineapple juice 5 pints and water 6 pints; or yeast 10 pounds, fresh orange juice 20 pints and sugar 10 pounds. Lemon juice or grape fruit juice may be used with yeast in the same proportions as orange or pineapple juice.

If desired, half of the fruit juice (more or less) may be replaced by fresh or skimmed milk in which case precautions as in the case of especially reactive juices should be taken as to immediate desiccation after the ingredients of the mixture are blended in fluid form. A mixture formed of fresh pineapple juice, yeast and milk in moist condition quickly jellifies but by quickly desiccating a freshly prepared atomized mixture of this character, before it has had time to thicken by reactions which tend to occur, a dry powder may be obtained capable of being subsequently moistened with water or a mixture containing water and sugar or other ingredients to form a jellied or creamy mixture which may be directly used as a food, medicine or beverage or in mixture with other desired foods, medicines or beverages.

A desiccated composition comprising yeast and fruit juice solids as prepared in accordance with my invention possesses the advantage of combining in a single composition readily soluble and miscible in water all the vitamines of yeast and those of the fruit juice employed, for example orange juice, and of furnishing these vitamines together in a highly convenient and palatable form. The compositions may be formed into tablets if desired for further convenience in dispensing.

While fruit juices and yeast may be desiccated separately from each other and the desiccated products may be subsequently mixed together in proper proportions, the desiccation of the fruit juices and yeast in mixture together is to be preferred as it is especially convenient and further has the advantage of producing a dried product in which the particles are substantially homogeneous and in which the yeast, during drying, has been protected by the associated fruit juices.

While my invention is primarily intended for the production of an unfermented or substantially unfermented product, a product of substantially non-alcoholic character and suitable for the preparation of soda fountain beverages or the like may be obtained by permitting a fruit juice (e. g. grape juice) to undergo a limited fermentation with a yeast (with or without additional sugar or sugar-containing material) and then desiccating the product in accordance with my invention in its broader features. Such compositions are intended to be included within the scope of my invention as claimed.

What I claim is:

1. The method of preparing a comminuted product comprising yeast and fruit juices solids which comprises mixing yeast with a sufficient quantity of a solution of fruit juice solids to form a fluent mixture, introducing said mixture in finely subdivided form into contact with an aeroform fluid and maintaining the latter in contact with the subdivided particles of the yeast mixture suspended therein for a sufficient time and at a sufficiently high temperature to desiccate the particles.

2. A comminuted and substantially dry composition consisting essentially of yeast particles encapsulated by fruit juice solids.

3. A comminuted and substantially dry composition consisting essentially of yeast particles encapsulated in a conjointly desiccated fruit juice.

4. A comminuted and substantially dry composition consisting essentially of yeast particles encapsulated in a conjointly desiccated orange juice.

5. A comminuted and substantially dry composition consisting essentially of yeast particles encapsulated by the solids of orange juice.

6. A comminuted and substantially dry composition consisting essentially of yeast and a soluble vitamine-containing desiccated fruit juice encapsulating the yeast cells.

7. A substantially dry composition comprising essentially yeast particles encapsulated by fruit juice solids.

8. A substantially dry food composition comprising essentially yeast particles encapsulated by milk solids and fruit juice solids.

9. A comminuted and substantially dry composition consisting essentially of yeast encapsulated in and associated with milk solids and fruit juice solids.

10. A comminuted and substantially dry composition consisting essentially of yeast encapsulated in and associated with milk solids and fruit juice solids and containing active enzymes and vitamines.

11. The method of desiccating mixtures containing yeast and reactive fruit juices, which comprises bringing together the ingredients of the mixture in liquid condition substantially coincident with their atomization, atomizing such ingredients together into an aeroform desiccating fluid of such temperature and volume as to evaporate moisture from the atomized material and to reduce its particles to a substantially dry condition such that the ingredients of the product are substantially non-reactive toward each other and separating the dried particles from the aeroform fluid.

12. A substantially homogeneous dry composition consisting essentially of yeast particles encapsulated by fruit juice solids.

13. A substantially homogeneous dry composition consisting essentially of yeast particles encapsulated by the solids of orange juice.

14. A substantially homogeneous dry composition comprising essentially conjointly spray-desiccated yeast and fruit juice solids.

In witness whereof, I have hereunto signed my name to the specification on the 27th day of June, 1922.

BAYLIS M. DAWSON.